No. 700,185. Patented May 20, 1902.
H. EBERTS.
LARDING PIN.
(Application filed Feb. 25, 1901.)
(No Model.)
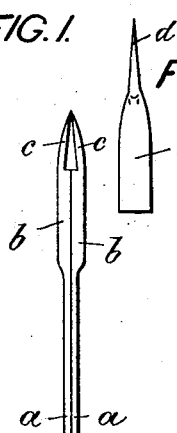
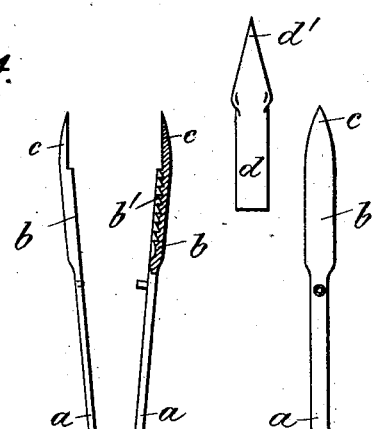
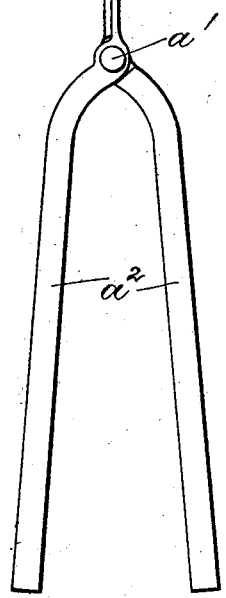
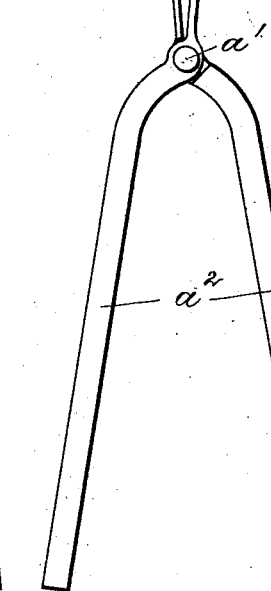
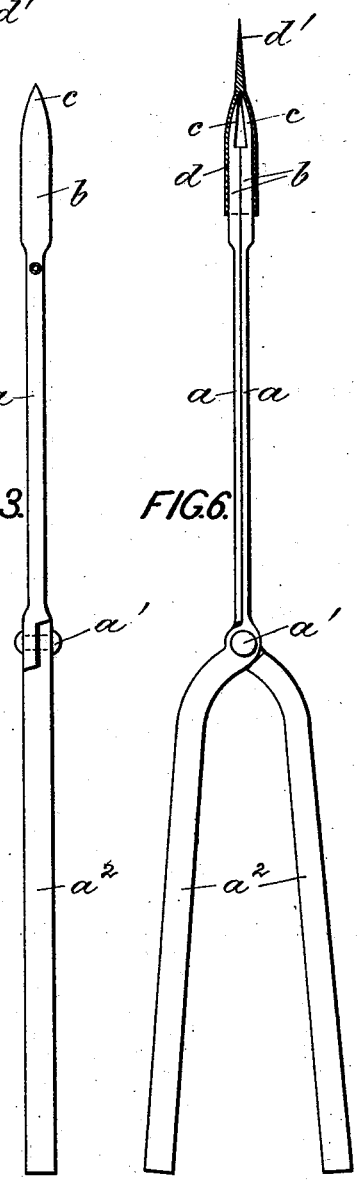
Witnesses:
Arthur Tuup
William Schulz
Inventor:
Heinrich Eberts
by his attorneys
Roeder & Briesen

UNITED STATES PATENT OFFICE.

HEINRICH EBERTS, OF CREFELD, GERMANY.

LARDING-PIN.

SPECIFICATION forming part of Letters Patent No. 700,185, dated May 20, 1902.

Application filed February 25, 1901. Serial No. 48,746. (No model.)

*To all whom it may concern:*

Be it known that I, HEINRICH EBERTS, a citizen of Germany, and a resident of Crefeld, Germany, have invented certain new and useful Improvements in Larding-Pins, of which the following is a specification.

This invention relates to a larding-pin by means of which the larding of the meat is greatly facilitated.

In the accompanying drawings, Figure 1 is a side view of my improved larding-pin, showing it closed. Fig. 2 is a side view, partly in section, thereof, showing it open; Fig. 3, a view at right angles to that of Fig. 2; Fig. 4, an edge view of the cap $d$, showing it detached; Fig. 5, a side view thereof; and Fig. 6, a side view of the larding-pin, showing the cap attached in section.

The larding-pin is composed of a pair of long and narrow shanks $a$, which are pivotally connected at $a'$ and terminate in handles $a^2$, so as to resemble a pair of tongs. At their forward ends the shanks $a$ are widened to form jaws $b$, which are hollowed and may be provided with serrations $b'$. Beyond the jaws $b$ the shanks $a$ are pointed, as at $c$, and over each of these points is adapted to be fitted a cap $d$, having a point $d'$. The pointed caps $d$ are removable, so that they may be readily cleaned or interchanged to suit finer or coarser meats.

In use the jaws carrying the caps are forced through the meat, are then opened for the introduction of the leaf-lard or bacon, and after being closed are drawn back, so that the fat is retained within the meat.

What I claim is—

A larding-pin composed of a pair of pivotally-connected shanks having jaws, and of removable pointed caps adapted to be fitted over said jaws, substantially as specified.

Signed by me at Crefeld, Germany, this 1st day of February, 1901.

HEINRICH EBERTS.

Witnesses:
WM. P. PHELPS,
M. E. KENNEDY.